United States Patent
Hattass et al.

(10) Patent No.: US 8,955,380 B2
(45) Date of Patent: Feb. 17, 2015

(54) ROTATION RATE SENSOR

(75) Inventors: Mirko Hattass, Stuttgart (DE); Benjamin Schmidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 13/234,878

(22) Filed: Sep. 16, 2011

(65) Prior Publication Data
US 2012/0067123 A1    Mar. 22, 2012

(30) Foreign Application Priority Data

Sep. 16, 2010 (DE) .......................... 10 2010 040 908

(51) Int. Cl.
*G01C 19/56* (2012.01)
*G01C 19/5726* (2012.01)

(52) U.S. Cl.
CPC .................................. *G01C 19/5726* (2013.01)
USPC ..................................... 73/504.12; 73/504.01

(58) Field of Classification Search
USPC .............................. 73/504.12, 504.01, 504.08
See application file for complete search history.

(56) References Cited

U.S. PATENT DOCUMENTS

| 6,535,663 B1* | 3/2003 | Chertkow | 385/18 |
| 2008/0229822 A1* | 9/2008 | Kato | 73/504.12 |
| 2010/0037690 A1* | 2/2010 | Gunthner et al. | 73/504.04 |

FOREIGN PATENT DOCUMENTS

DE    10 2009 000 679    8/2010

* cited by examiner

*Primary Examiner* — Hezron E Williams
*Assistant Examiner* — Xin Zhong
(74) *Attorney, Agent, or Firm* — Maginot, Moore & Beck LLP

(57) ABSTRACT

A micromechanical rotation rate sensor, in particular for use in motor vehicles, includes a substrate, at least one seismic mass, which is arranged in a sprung manner on the substrate, drive means for production of a periodic movement of the seismic mass, force detection means for detection of a Coriolis force, which acts on the seismic mass as a result of rotation about a rotation axis which is at right angles to the excitation direction, and measurement means, wherein the measurement means are designed for measurement of structural deviations of the rotation rate sensor.

3 Claims, 5 Drawing Sheets

ROTATION RATE SENSOR

This application claims priority under 35 U.S.C. §119 to German patent application no. DE 10 2010 040 908.1, filed Sep. 16, 2010 in Germany, the disclosure of which is incorporated herein by reference in its entirety.

BACKGROUND

The disclosure relates to a rotation rate sensor, in particular for use in motor vehicles.

Micromechanical rotation rate sensors are used for detection of a current movement state in a wide range of technical fields, for example in driving stability systems in a motor vehicle, or else for navigation.

A rotation rate sensor such as this normally comprises a so-called spring-mass system having a substrate, which acts as a reference, and having a seismic mass, which is arranged such that it can move with respect to the substrate. A reaction of the seismic mass to a rotary movement is in this case used to detect the rotary movement. For example, in the case of a rotation rate sensor whose detection of the rotation rate is based on the Coriolis effect, the seismic mass is deflected at right angles to the rotation axis. The radial movement of the seismic mass results in a change in the rotating system to the path velocity thereof, which leads to a corresponding Coriolis force on the seismic mass. This Coriolis force can be measured as a tangential acceleration. If the characteristics of the rotation rate sensor are known, that is to say for example the mechanical characteristics of the spring-mass system, the current rotation velocity, and therefore the rotation rate, can be calculated from this.

In order to measure the Coriolis force, a defined movement of the seismic mass is first of all necessary. For this purpose, a periodic movement of the seismic mass is produced, for example, by means of a capacitive drive. This can likewise be used for detection of the Coriolis force. One such sensor has been disclosed, for example, in DE 10 2009 000 679 A1.

Therefore, overall, a movement of the seismic mass takes place both on the plane of the drive and at right angles to it, because of the Coriolis force. Undesirable oscillations occur in this case, caused by the drive. These undesirable oscillations are also detected as so-called quadrature signals, and corrupt the measurement results. One reason for these undesirable oscillations is, for example, deformations, asymmetries, etc. in the structure of the rotation rate sensor, caused by manufacturing tolerances during the production of the rotation rate sensor.

A change in the ambient temperature leads to deformations of the measurement structure within the rotation rate sensor. In consequence, the measurement sensitivity of the rotation rate sensor changes or drifts in some cases by up to 10%.

In order to produce a rotation rate sensor, it is therefore necessary to compensate for these deformations, for example by means of temperature curves.

SUMMARY

The micromechanical rotation rate sensor defined herein, in particular for use in motor vehicles, comprises a substrate, at least one seismic mass, which is arranged in a sprung manner on the substrate, drive means for production of a periodic movement of the seismic mass, force detection means for detection of a Coriolis force, which acts on the seismic mass as a result of rotation about a rotation axis which is at right angles to the excitation direction, and measurement means, wherein the measurement means are designed for measurement of structural deviations of the rotation rate sensor.

The method for the production of a test signal for a measurement of the measurement sensitivity of a rotation rate sensor, in particular suitable for being carried out by a rotation rate sensor according to according to the disclosure, comprises the following steps: production of an antiphase oscillation of at least two seismic masses on an oscillation plane, influence of a Coriolis force on the seismic masses, deflection of the seismic masses at right angles to the oscillation plane, on the basis of the Coriolis force, influence of a stress on the rotation rate sensor, production of a structural deviation of the rotation rate sensor by the influencing stress, variation of the measurement sensitivity of the rotation rate sensor on the basis of the structural deviation, and production of a test signal, which is independent of the structural deviation of the rotation rate sensor, for measurement of the measurement sensitivity of the rotation rate sensor.

In the description, the term structural deviations means, for example, deformations and changes in the rotation rate sensor, in particular in the substrate, etc.

Therefore, the advantage achieved is that the structural changes, such as deformation of the substrate of the rotation rate sensor, are therefore identified reliably. For example, the structural deviation detected by the measurement means can be used by the measurement means itself or by further suitable compensation means to produce an appropriate test signal, which is essentially independent of the structural deviation, for example the deformation of the substrate. This test signal can then be evaluated by already existing circuits etc., and can be used during subsequent operation of the rotation rate sensor as a reference for the measurement of the measurement sensitivity.

Further features and advantages of the disclosure are described below.

According to one advantageous development of the disclosure, the measurement means are arranged on the seismic mass and/or on the substrate. The advantage in this case is that a structural change or deviation can be detected by the measurement means in a simple manner. If the measurement means are arranged both on the seismic mass and on the substrate, they can detect not only a structural deviation of the seismic mass but also of the substrate, and can also be used for possible compensation for the two structural deviations, for example simultaneous deformation of the seismic mass and substrate.

According to a further advantageous development of the disclosure, the measurement means comprise at least one electrode structure, which has at least two interacting electrodes. The electrode structure allows a simple and cost-effective embodiment of the measurement means and, likewise, reliable measurement of structural deviations of the rotation rate sensor.

According to a further advantageous development of the disclosure, at least one of the interacting electrodes is in the form of a substrate electrode, and at least one of the electrodes is in the form of a ground electrode. The advantage achieved in this case is that, for example, a relative structural change between the substrate and the seismic mass can therefore be measured directly.

According to a further advantageous development of the disclosure, the electrode structure comprises at least two ground electrodes, which, in particular, are arranged symmetrically with respect to one another. Structural deviations of the rotation rate sensor can be detected more reliably by the symmetrical arrangement of the ground electrodes, working in conjunction with at least one substrate electrode, since deviations and/or drifts of a capacitance can be reduced by averaging of capacitances between the respective ground electrode and the substrate electrode.

According to a further advantageous development of the disclosure, the ground electrodes and the substrate electrode are arranged symmetrically with respect to one another, at least in a rest position. The advantage achieved in this case is that the ground electrodes and the substrate electrode are therefore each arranged opposite in the rest state, or at a zero crossing, or in general for a specific deflection, preferably a maximum deflection, during an oscillation of the seismic mass. When arranged symmetrically in the rest state, a force impulse acts in the same direction as the oscillation direction at the zero crossing in the event of a corresponding oscillation for the seismic mass, thus resulting in a signal from the electrode structure at twice the drive frequency of the drive means, and this then acts as reference signal for the measurement sensitivity of the rotation rate sensor.

According to a further advantageous development of the disclosure, the at least one ground electrode is arranged in a recess in the seismic mass, and the substrate electrode is designed such that it can engage at least partially in the recess. This allows the substrate and ground electrodes to interact in a simple and reliable manner.

According to a further advantageous development of the disclosure, a multiplicity of electrode structures are arranged essentially in an extent at right angles to a direction of the periodic movement of the seismic mass. The multiplicity of electrode structures allow structural deviations of the rotation rate sensor to be measured even more reliably.

According to a further advantageous development of the disclosure, the force detection means for measurement of structural deviations of the rotation rate sensor are embodied as measurement means. This allows not only the detection of the Coriolis force but also the production of a signal for structural deviations of the rotation rate sensor in a simple and cost-effective manner. This can be done, for example, by a suitable clock-control drive for the respective substrate and ground electrodes.

BRIEF DESCRIPTION OF THE DRAWINGS

Further features of the disclosure will be explained in more detail in the following description and are illustrated in the drawing, in which.

DETAILED DESCRIPTION

The same reference symbols denote the same elements, or elements having the same function, in the figures.

Figure 1:
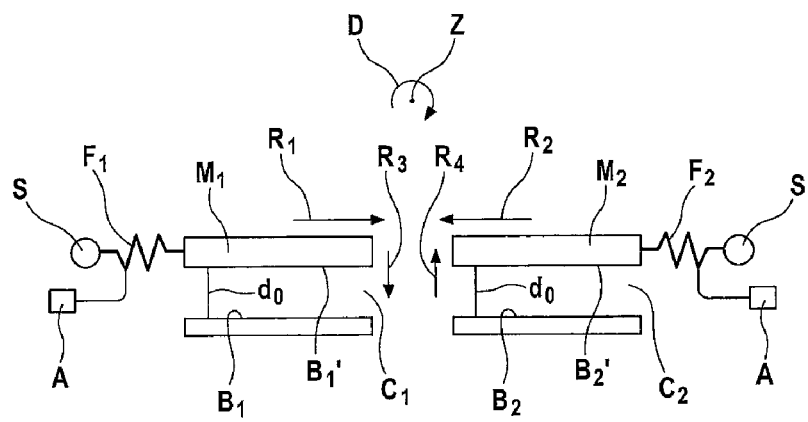
FIG. 1 shows a side view of a schematic, outlined design of a conventional rotation rate sensor.

FIG. 1 shows a side view of a schematic outline design of a conventional rotation rate sensor.

In FIG. 1, reference symbols $M_1$, $M_2$ denote two seismic masses of a rotation rate sensor, which are respectively fixed in a sprung manner on the substrate S by means of a spring $F_1$, $F_2$. The springs $F_1$, $F_2$ are furthermore each connected to drive means A, which are used to produce a periodic oscillation of the seismic masses $M_1$, $M_2$ in respectively opposite, horizontal directions $R_1$, $R_2$. The seismic masses $M_1$, $M_2$ in this case oscillate to the left and right on the plane of the sheet in both directions $R_1$, $R_2$. Ground electrodes $B_1'$, $B_2'$ are arranged on the lower face of the seismic masses $M_1$, $M_2$ and interact with respective substrate electrodes $B_1$, $B_2$, which are arranged on the substrate S, in order to measure the Coriolis force on the seismic masses $M_1$, $M_2$. A rotation rate can then be determined from a capacitance change of capacitances at $C_1$, $C_2$ between the respective substrate electrodes $B_1$, $B_2$ and the respective ground electrodes $B_1'$, $B_2'$.

When a rotation takes place, for example in the clockwise sense D about an axis Z which runs at right angles into the plane of the drawing, the seismic mass $M_2$ experiences an acceleration in the direction $R_4$ upward in the plane of the drawing in FIG. 1, on the right-hand side. A distance $d_0$ between the substrate electrode $B_2$ and the ground electrode $B_2'$, which corresponds to a rest state without rotation, is increased while, in contrast, the distance $d_0$ between the substrate electrode $B_1$ and the ground electrode $B_1'$ is correspondingly reduced, since this carries out a movement in the direction $R_3$, in the opposite direction to $R_4$.

The change in the distance between the substrate and ground electrodes $B_1$, $B_1'$, $B_2$, $B_2'$ also results in a change in the corresponding capacitances $C_1$, $C_2$ between the substrate and ground electrodes $B_1$, $B_1'$, $B_2$, $B_2'$. These capacitance changes are measured, and the rotation rate is determined essentially on the basis thereof.

Figure 2:
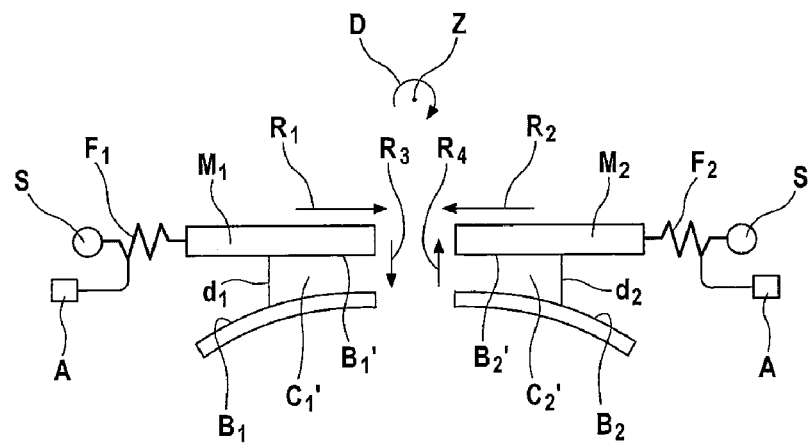
FIG. 2 shows a schematic, outline design of a conventional rotation rate sensor as shown in FIG. 1, with stress introduced.

FIG. 2 shows a schematic, outline design of a conventional rotation rate sensor as shown in FIG. 1, with stress introduced.

In contrast to FIG. 1, the rotation rate sensor in FIG. 2 is subject to stress introduction. In consequence, the substrate electrodes $B_1$, $B_2$ which are fixed to the substrate S are deformed. This changes the distance $d_1$, $d_2$ between the respective ground and substrate electrodes $B_1$, $B_1'$, $B_2$, $B_2'$ parallel to the respective drive directions $R_1$, $R_2$. This adversely affects the measurement sensitivity of the rotation rate sensor.

Figure 3:
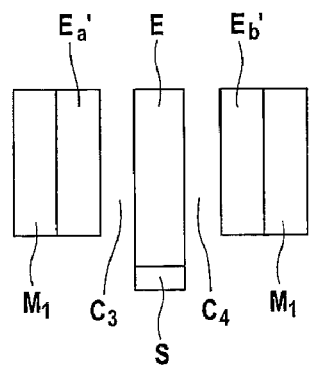
FIG. 3 shows a side view of an electrode structure according to a first embodiment of the present disclosure.

FIG. 3 shows a side view of an electrode structure according to a first embodiment of the present disclosure.

FIG. 3 shows a substrate electrode E which is in the form of a vertically arranged finger electrode. A seismic mass $M_1$ is arranged to the left and right of the substrate electrode E. This is illustrated as being essentially rectangular and in each case has ground electrodes $E_a'$, $E_b'$ on its substrate electrode E, which is likewise illustrated as being rectangular. In the rest state, the upper edge of the substrate electrode E and the upper edges of the ground electrodes $E_a'$, $E_b'$ are essentially at the same height. In this case, the substrate electrode E is, however, designed to be longer in its vertical extent than the ground electrodes $E_a'$, $E_b'$ and, because of edge fields after application of a certain voltage to the substrate or ground electrodes E, $E_a'$, $E_b'$ an edge force downwards on the ground electrodes $E_a'$, $E_b'$ acts on the lower edges of the ground electrodes $E_a'$, $E_b'$, as shown in FIG. 3. This edge force results in the mass $M_1$ being correspondingly shifted from its position. This causes capacitance changes between the substrate and ground electrodes $B_1$, $B_1'$, $B_2$, $B_2'$, which are used to measure the Coriolis force (see FIG. 1). These additional capacitance changes produce an additional signal, which is also referred to as a test signal, and can be evaluated via the same signal path as the rotation velocities to be measured by means of the rotation rate sensor. Since the edge force is independent of any substrate deformations, the magnitude of the test signal which is output at the end of the signal path allows determination of the measurement sensitivity of the rotation rate sensor.

Capacitances $C_3$, $C_4$ are formed by the application of voltage to the substrate electrode E and to the ground electrode $E_a'$, $E_b'$. This change in the capacitances $C_3$, $C_4$ can additionally be measured, in order to improve the reliability of the rotation rate sensor, and the measurement of the measurement sensitivity: when changed capacitances $C_3$, $C_4$ are measured with an unchanged voltage, this indicates a change in the edge force, and therefore deformations of the substrate S and/or of the seismic mass $M_1$.

Figure 4:
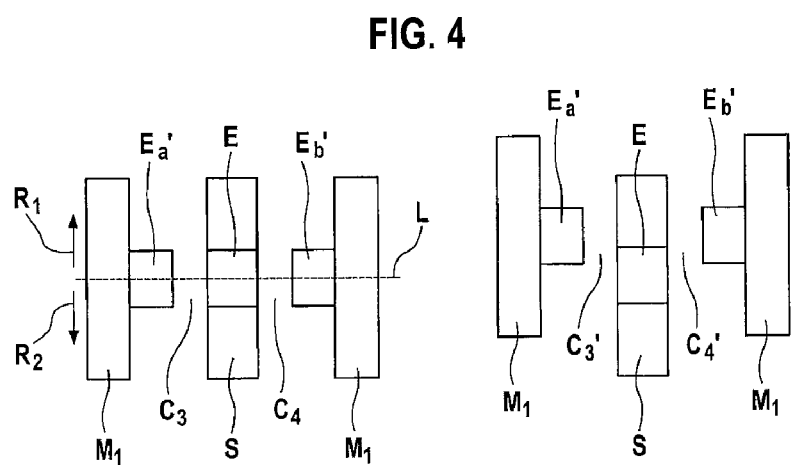
FIG. 4 shows an electrode structure as shown in FIG. 3 in a plan view when passing through a rest position and in a deflected position.

FIG. 4 shows a plan view of an electrode structure as shown in FIG. 3 when passing through a rest position and in a deflected position.

The left-hand side of FIG. 4 shows the seismic mass $M_1$ passing through a rest position, when this is deflected in the vertical direction $R_1$, $R_2$ as shown in FIG. 4. The ground electrodes $E_a'$, $E_b'$ and the substrate electrode E are in this case arranged essentially on a common line L, which runs horizontally as shown in FIG. 4.

The right-hand side of FIG. 4 shows essentially the arrangement of the substrate electrode E and the ground electrodes $E_a'$, $E_b'$, with the seismic mass $M_1$ having been deflected upward together with the ground electrodes $E_a'$ $E_b'$. The capacitances $C_3'$, $C_4'$ in the deflected state of the seismic mass $M_1$, and the capacitances $C_3$, $C_4$ in the rest state and on passing through the zero position are different and compensate the edge force because of the edge fields described above, provided that an overlap length of the substrate electrode E with the respective ground electrode $E_a'$, $E_b'$ measured in the respective direction $R_1$ or $R_2$, is less than the amplitude of the seismic mass resulting from the drive A. In consequence, a zero crossing of the seismic mass $M_1$ leads to a force impulse on the seismic mass, which is essentially proportional to a capacitance change between the capacitances $C_3$, $C_3'$ and $C_4$, $C_4'$, and is proportional to the square of the applied voltage. The measurement sensitivity of the rotation rate sensor is then determined by means of the signal produced by the force impulse.

Figure 5:
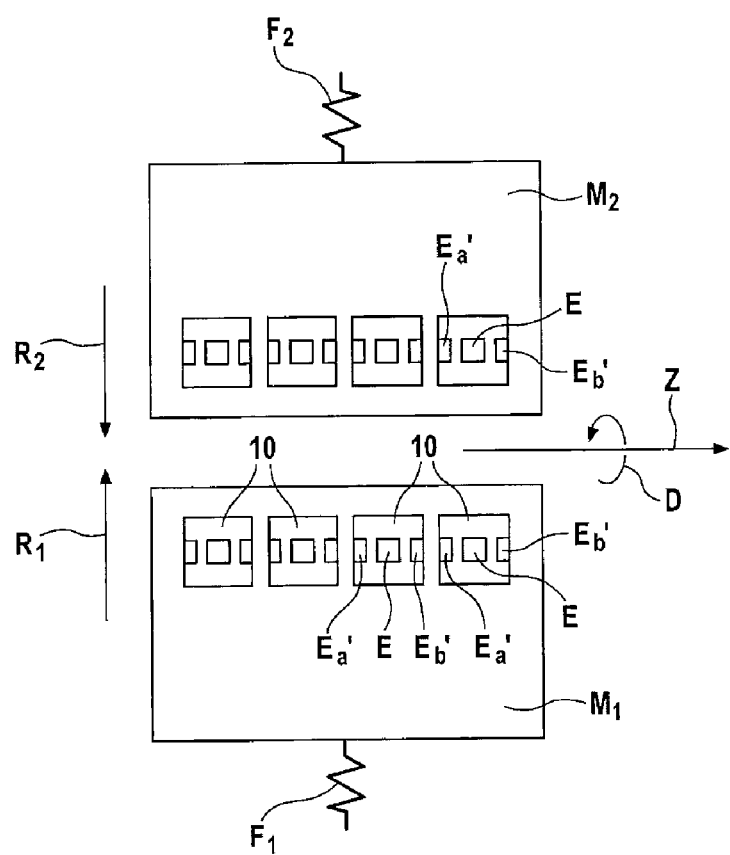
FIG. 5 shows a plan view of a rotation rate sensor according to a second embodiment of the present disclosure, in a rest position.

FIG. 5 shows a plan view of a rotation rate sensor according to a second embodiment of the present disclosure, in a rest position.

In FIG. 5, two seismic masses $M_1$, $M_2$ are fixed to a substrate (which is not shown) by means of springs $F_1$, $F_2$. In this case, the seismic masses $M_1$, $M_2$ oscillate in antiphase in the vertical direction $R_1$, $R_2$ on the plane of the drawing, in order to detect a rotation D about an axis Z which is arranged horizontally in the plane of the drawing. The seismic masses $M_1$, $M_2$ each have four rectangular cutouts 10 at right angles to the deflection direction in the area which is adjacent to the respective other seismic mass $M_1$, $M_2$, in which cutouts 10 two ground electrodes $E_a'$, $E_b'$ are in each case arranged on the left-hand and right-hand sides. As is illustrated in FIG. 3, a substrate electrode E in each case extends between them and, as described in the previous figures, in each case forms two capacitances. In the case of this rotation rate sensor, the force impulse as described above occurs in the same direction at each zero crossing of the oscillation of the seismic masses $M_1$, $M_2$, as a result of which a signal is produced for measurement of the measurement sensitivity of the rotation rate sensor, at twice the frequency f of the oscillation of the drive. In this case, it is possible to obtain a force impulse by control of the oscillations of the seismic masses $M_1$, $M_2$, when the voltage supply for the electrodes E, $E_a'$, $E_b'$, is operated clocked in time, only for one of the two zero crossings (on the one hand in the direction $R_1$, and on the other hand in the direction $R_2$).

Figure 6:
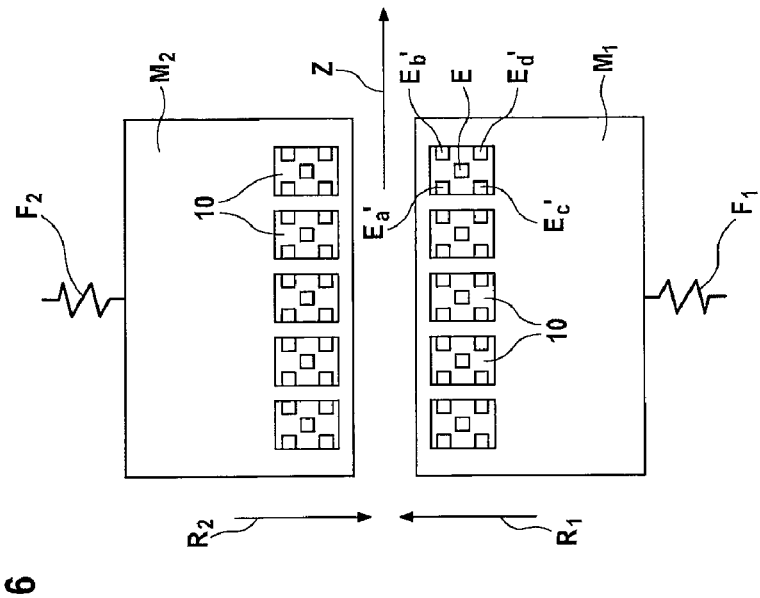
FIG. 6 shows a plan view of a rotation rate sensor according to a third and fourth embodiment of the present disclosure.
Figure 6:
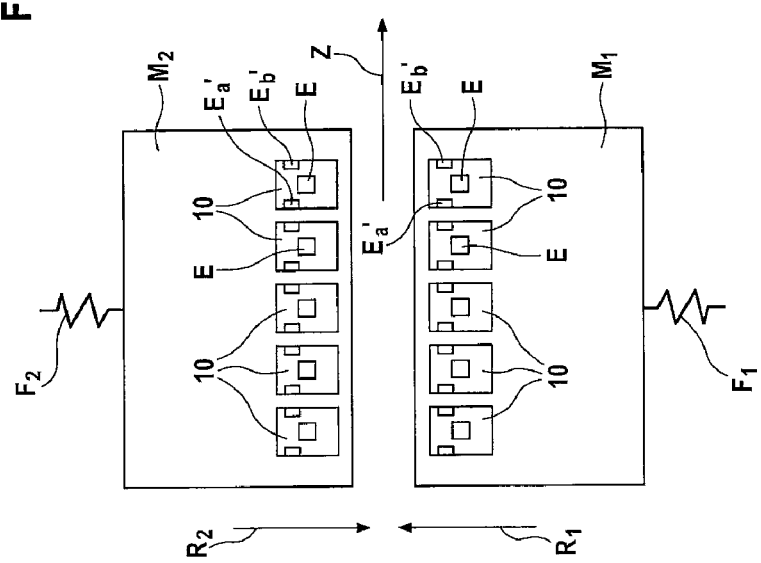

FIG. 6 shows a plan view of a rotation rate sensor according to a third and a fourth embodiment of the present disclosure.

The design of the rotation rate sensors shown on the left and right in FIG. 6 differs from the design of the rotation rate sensor shown in FIG. 5 only in the embodiment of the electrode structure of the ground and substrate electrodes E, $E_a'$, $E_b'$, and in the number of electrode structures (five instead of four for each seismic mass $M_1$, $M_2$). The rest position of the two seismic masses $M_1$, $M_2$ is shown on the left-hand side in FIG. 6. In this case, the ground electrodes $E_a'$, $E_b'$ are each arranged such that they have a maximum overlap with the substrate electrode E at a maximum deflection of the respective seismic mass $M_1$, $M_2$. In this case, in each case only one seismic mass $M_1$, $M_2$ with the associated ground electrodes $E_a'$, $E_b'$ has an overlap at its maximum deflection in one direction. The ground electrodes $E_a'$, $E_b'$ of the seismic masses $M_1$, $M_2$ are therefore arranged such that the ground electrodes of the upper seismic mass $M_2$, which is arranged on the left-hand side as shown in FIG. 6, are arranged behind the respectively associated substrate E, viewed at right angles away from the rotation axis, while in contrast, when viewed from the rotation axis Z to the lower seismic mass $M_1$, the ground electrode $E_a'$, $E_b'$ is arranged in front of the substrate electrode E. The force impulse would therefore result in production of a signal which is in phase with a if quadrature signal.

The rest position of the two seismic masses $M_1$, $M_2$ is in turn shown on the right-hand side of FIG. 6. Four ground electrodes $E_a'$, $E_b'$, $E_c'$, $E_d'$ are now shown in the rectangular cutout 10, and are arranged symmetrically within the rectangular cutout: two of the four ground electrodes $E_a'$, $E_b'$, $E_c'$, $E_d'$ are in each case arranged on the left-hand side and on the right-hand side of the cutout 10. In this case, the substrate electrode E projects between the four ground electrodes $E_a'$, $E_b'$, $E_c'$, $E_d'$. Viewed from the rotation axis Z, in the direction of the respective seismic masses $M_1$, $M_2$, two ground electrodes $E_a'$, $E_b'$, the substrate electrode E and, finally, the further two ground electrodes $E_c'$, $E_d'$, are arranged. An overlap and therefore a force impulse are produced in this way at each of the two maximum deflections of the seismic masses $M_1$, $M_2$, thus resulting in a 2f quatrature signal being produced overall.

Figure 7:
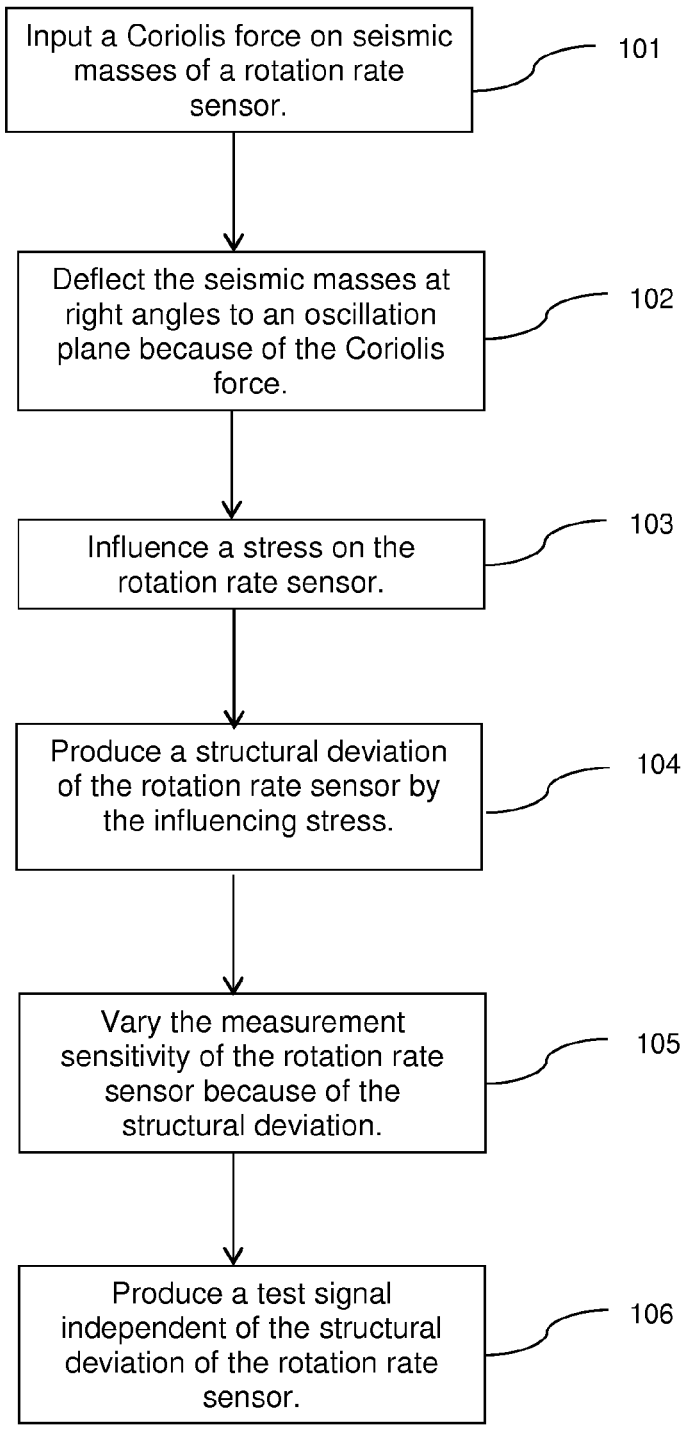
FIG. 7 shows steps in a method according to a first embodiment of the present disclosure.

FIG. 7 shows steps in the method according to a first embodiment of the present disclosure.

In FIG. 7, the reference symbol 100 denotes the step of production of an antiphase oscillation of at least two seismic masses $M_1$, $M_2$ in an oscillation plane. Reference symbol 101 denotes the step of inputting a Coriolis force on the seismic masses $M_1$, $M_2$, reference symbol 102 denotes the step of deflection of the seismic masses at right angles to the oscillation plane because of the Coriolis force, reference symbol 103 denotes the step of influencing a stress on the rotation rate sensor, reference symbol 104 denotes the step of production of a structural deviation of the rotation rate sensor by the influencing stress, reference symbol 105 denotes the step of varying the measurement sensitivity of the rotation rate sensor because of the structural deviation, and reference symbol 106 denotes the step of production of a test signal, which is independent of the structural deviation of the rotation rate sensor, for measurement of measurement sensitivity of the rotation rate sensor, on the basis of the measured structural deviation.

What is claimed is:

1. A method for producing a test signal for a measurement of the measurement sensitivity of a rotation rate sensor, the rotation rate sensor including a seismic mass and a substrate configured to detect a Coriolis force, comprising:
- producing an antiphase oscillation of at least two seismic masses on an oscillation plane;
- influencing a Coriolis force on the seismic masses;
- deflecting the seismic masses at right angles to the oscillation plane, based on the Coriolis force;
- influencing a stress on the rotation rate sensor;
- producing a structural deviation of the rotation rate sensor by the influencing stress, wherein the structural deviation includes a deformation of the seismic mass or deformation of the substrate;
- varying the measurement sensitivity of the rotation rate sensor based on the structural deviation; and
- producing a test signal, which is independent of the structural deviation of the rotation rate sensor produced by the Coriolis force, for measurement of the measurement sensitivity of the rotation rate sensor based on the measured structural deviation.

2. The method for producing a test signal according to claim 1, where the producing a structural deviation of the rotation rate sensor includes a simultaneous deformation of the seismic mass and the substrate.

3. The method for producing a test signal according to claim 1, wherein the producing a test signal includes forming a first and a second capacitance by the application of a voltage to a substrate electrode and to a ground electrode and determining a change to the first and second capacitances with the voltage being unchanged to thereby indicate a change in the edge force and a deformation of one of the seismic mass and the substrate.

* * * * *